United States Patent [19]

Babel

[11] Patent Number: 5,160,824
[45] Date of Patent: Nov. 3, 1992

[54] MACHINE TOOL FOR LASER-BEAM MACHINING OF WORKPIECES

[75] Inventor: Werner Babel, Pfronten, Fed. Rep. of Germany

[73] Assignee: MAHO Aktiengesellschaft, Pfronten, Fed. Rep. of Germany

[21] Appl. No.: 877,252

[22] Filed: Apr. 28, 1992

Related U.S. Application Data

[63] Continuation of Ser. No. 809,435, Dec. 18, 1991, abandoned.

[30] Foreign Application Priority Data

Dec. 18, 1990 [DE] Fed. Rep. of Germany ....... 4040554

[51] Int. Cl.$^5$ .............................................. B23K 26/00
[52] U.S. Cl. ........................... 219/121.68; 219/121.84
[58] Field of Search ...................... 219/121.68, 121.69, 219/121.67, 121.72, 121.84

[56] References Cited

U.S. PATENT DOCUMENTS

| | | | |
|---|---|---|---|
| 2,861,166 | 11/1958 | Cargill, Jr. | 219/201 |
| 4,170,726 | 10/1979 | Okuda | 219/121.85 |
| 4,229,640 | 10/1980 | Longo | 219/121.69 |
| 4,335,296 | 6/1982 | Bredow | 219/121.67 |
| 4,352,973 | 10/1982 | Chase | 219/121.68 |
| 4,356,376 | 10/1982 | Komanduri et al. | 219/121.72 |
| 4,469,930 | 9/1984 | Takahashi | 219/121.72 |
| 4,644,126 | 2/1987 | Schumacher | 219/121.14 |
| 4,698,480 | 10/1987 | Klinger | 219/121.67 |

FOREIGN PATENT DOCUMENTS

| | | |
|---|---|---|
| 2443334 | 3/1975 | Fed. Rep. of Germany . |
| 3410913 | 10/1985 | Fed. Rep. of Germany . |
| 8701354 | 4/1987 | Fed. Rep. of Germany . |
| 8911733 | 12/1989 | Fed. Rep. of Germany . |
| 59-47086 | 11/1984 | Japan . |

*Primary Examiner*—C. L. Albritton
*Attorney, Agent, or Firm*—Baker, Maxham, Jester & Meador

[57] ABSTRACT

The invention is directed to a machine tool for laser beam machining of workpieces, comprising a housing mounted on a column and having a longitudinally movable guide tube disposed therein. The rear end portion of the housing has a laser unit mounted thereon, and the laser beam passes through a focussing optical system and exits from a nozzle head provided with means for supplying at least one fluid to the central exit opening of the laser beam. In order also to enable metal cutting machining of a workpiece the invention provides for a motor driven hollow main spindle journaled within the housing, the spindle having locking elements for fixing a tool holder therein. Advantageously, the focussing optical system and the nozzle head are attached to a standardized tool holder which can be fitted into the main spindle.

9 Claims, 3 Drawing Sheets

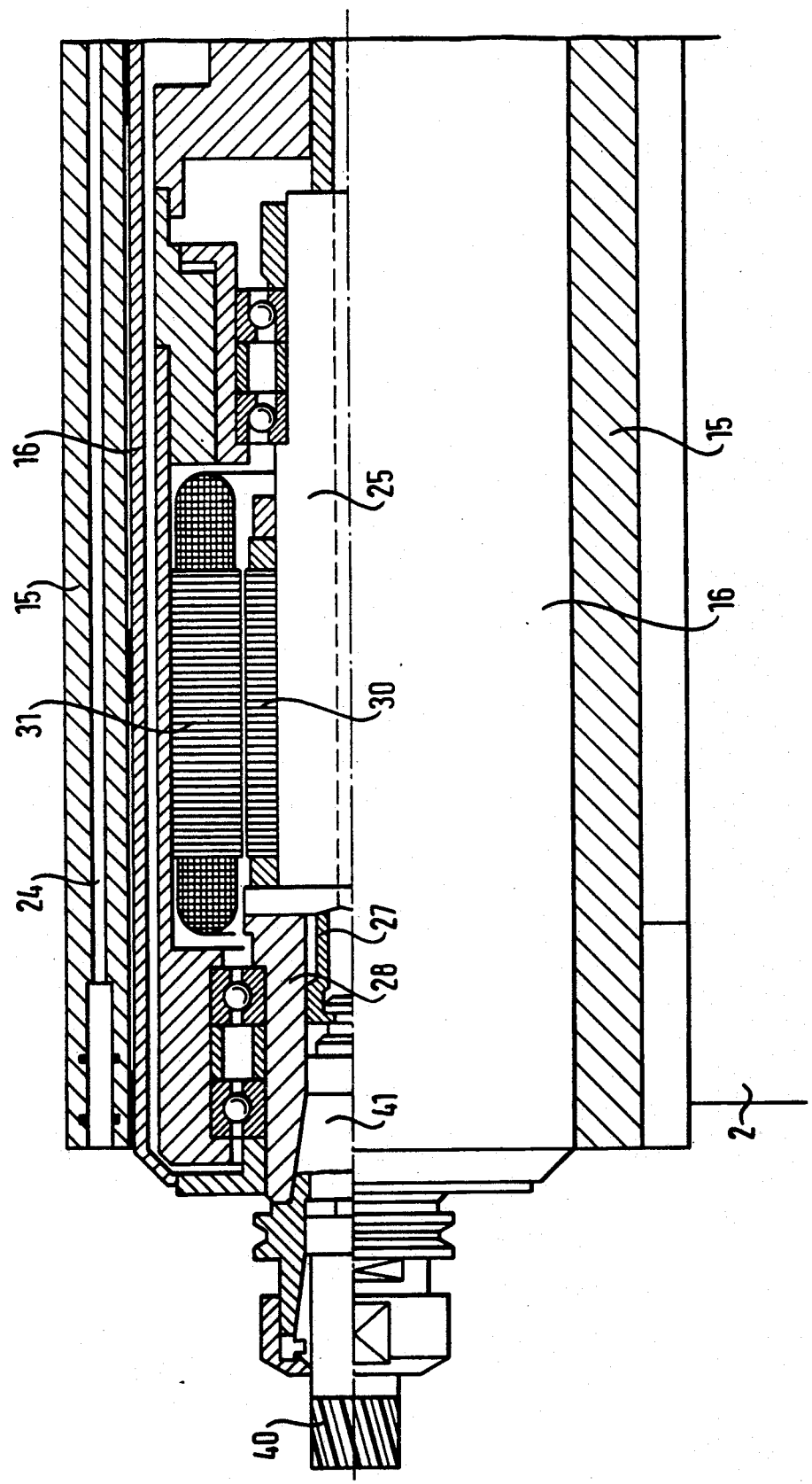

MACHINE TOOL FOR LASER-BEAM MACHINING OF WORKPIECES

This is a continuation of copending application Ser. No. 07/809,435 filed on Dec. 18, 1991, now abandoned.

FIELD OF THE INVENTION

The invention is directed to a machine tool for machining workpieces by laser beam, comprising a housing movably mounted on a column, a laser unit mounted on the housing, a focussing optical system for the laser beam, and a nozzle head mounted on the front end of the housing and including means for supplying at least one fluid to the central exit opening of the laser beam.

BACKGROUND OF THE INVENTION

Recently, various systems and apparatus for machining workpieces have been developed in which a laser beam constitutes the actual working tool for abrasive cutting, welding and/or machining. Apart from the abrasive cutting and welding of sheet metal, foils or the like, one field of application for correspondingly designed laser machines resides particularly in the machining and shaping of deeper cavities in solid workpieces. This field of application will become ever more important in the future, especially for machining formerly critical materials such as high alloy steels, cutting metals, ceramic materials, composite materials, glasses, etc. A number of publications such as, for example, German Pat. No. 2,443,334, German utility model 8701354.1, Japanese patent application No. 59-47086 and U.S. Pat. No. 4,644,126, disclose machining techniques using laser beams, in which a high energy $CO_2$-laser is focussed by means of an optical system and strikes the work together with a machining or auxiliary gas. However, all of these systems are limited to pure laser machining.

SUMMARY OF THE INVENTION

It is a major object of the present invention to provide a machine tool for machining workpieces by laser beam, the machine tool exhibiting a broader machining spectrum and permitting conventional cutting machining operations on a workpiece in a workholding fixture. In accordance with the present invention the specified object is met in that a main spindle is supported within the housing and comprises locking elements for fixing a tool holder.

An advantageous embodiment of the machine tool according to the invention is distinguished by the feature that the focussing optical system and the nozzle head are attached to a tool holder adapted to be mounted in the main spindle, wherein the main spindle which is supported in the housing along the axis of the laser beam accurately fixes the conventionally designed tool holder by its locking elements.

A further embodiment of the invention, which is adapted to the typical features of laser machining, is distinguished by the feature that within the housing a high-speed motor is disposed in coaxial relationship with the axis of the laser beam, the rotor of the motor being either directly coupled to the main spindle or adapted to be coupled thereto via a transmission. This embodiment is particularly advantageous because due to the high rotational speeds of this kind of motor it is possible with minimum additional space requirements to perform equalizing operations on the workpieces which were previously machined by the laser beam.

An essential advantage of the machine tool according to the present invention resides in the combined effect resulting from the fact that machining of a workpiece is possible by laser beam and by means of cutting tools on the same machine. For instance, using a high-speed motor with a rotational speed of more than 15,000 r.p.m., it is possible to perform equalizing operations on the workpiece surfaces previously produced by laser machining. Furthermore, it is also possible to machine multi-layered workpieces either by laser beam or by milling, drilling or grinding tools, depending on the special properties of the individual layers. This applies, for instance, to tools and their blanks which are coated either completely or partly with hard metal, ceramics or the like.

BRIEF DESCRIPTION OF THE DRAWING

The objects, advantages and features of this invention will be more readily apparent from the following detailed description, when read in conjunction with the accompanying drawing, in which.

FIG. 3 is a view similar to FIG. 2 illustrating the housing with a milling tool mounted thereon.

DESCRIPTION OF THE PREFERRED EMBODIMENTS

Figure 1:
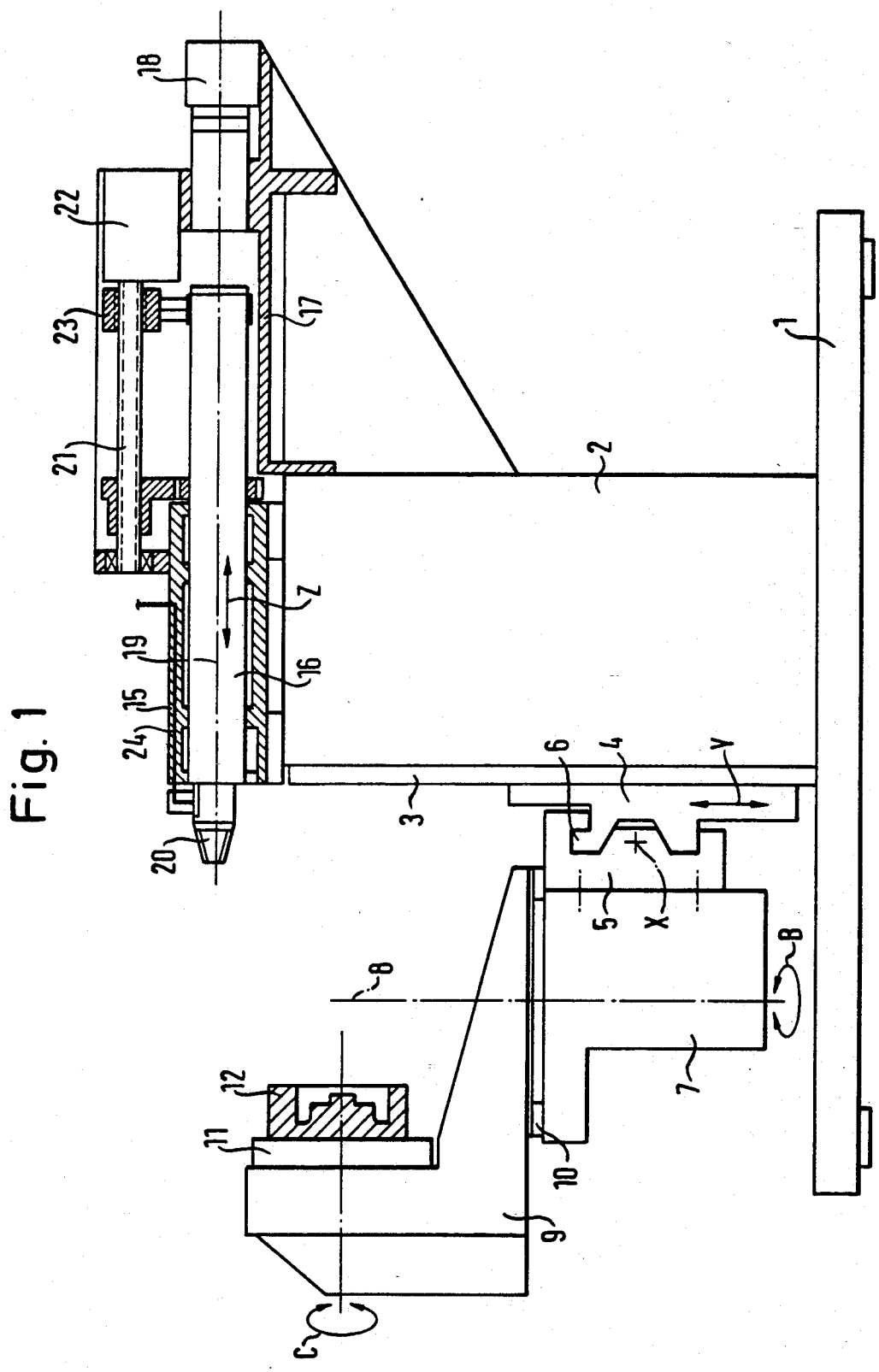
FIG. 1 is a partial sectional side view of a machine tool in accordance with the invention.

The machine tool schematically illustrated in FIG. 1 comprises base 1 on which rigid column 2 is mounted. Slideways 3 which are mounted on the front of column 2 are used to support knee table 4, which is vertically movable in the direction of double arrow Y and has a slide 5 mounted thereon which is horizontally movable along slideways 6 in the X-direction. Substructure 7 mounted on slide 5 carries a work table 9 which is rotatable about vertical axis 8 in the direction of arrow B and which is mounted on circular guide means 10 and is rotated about vertical axis 8 by a motor (not shown) mounted within substructure 7. A workpiece 12 is fixed on vertical table 11 which is motor-driven to be rotated about horizontal C-axis by means of an electric motor (not shown) installed in work table 9.

Column 2 has housing 15 mounted thereon in which guide tube 16 is accommodated for horizontal movement in the direction of double arrow Z. Behind the guide tube supporting bracket 17 is mounted on column 2 carrying laser unit 18 for generating a laser beam along axis 19 of the housing. The front end of the guide tube has nozzle/laser head 20 mounted thereon which will be described in detail with reference to FIG. 2. The feed motion of guide tube 16 is effected by means of a spindle drive, recirculating ball screw 21 of which is driven by motor 22 and causes translational movement of spindle nut 23 which acts on the guide tube. Nozzle head 20 is supplied with a working gas such as oxygen rich air, and optionally with a further fluid such as a flushing liquid, through passageways 24 of which only one is illustrated in FIG. 1.

Figure 2:
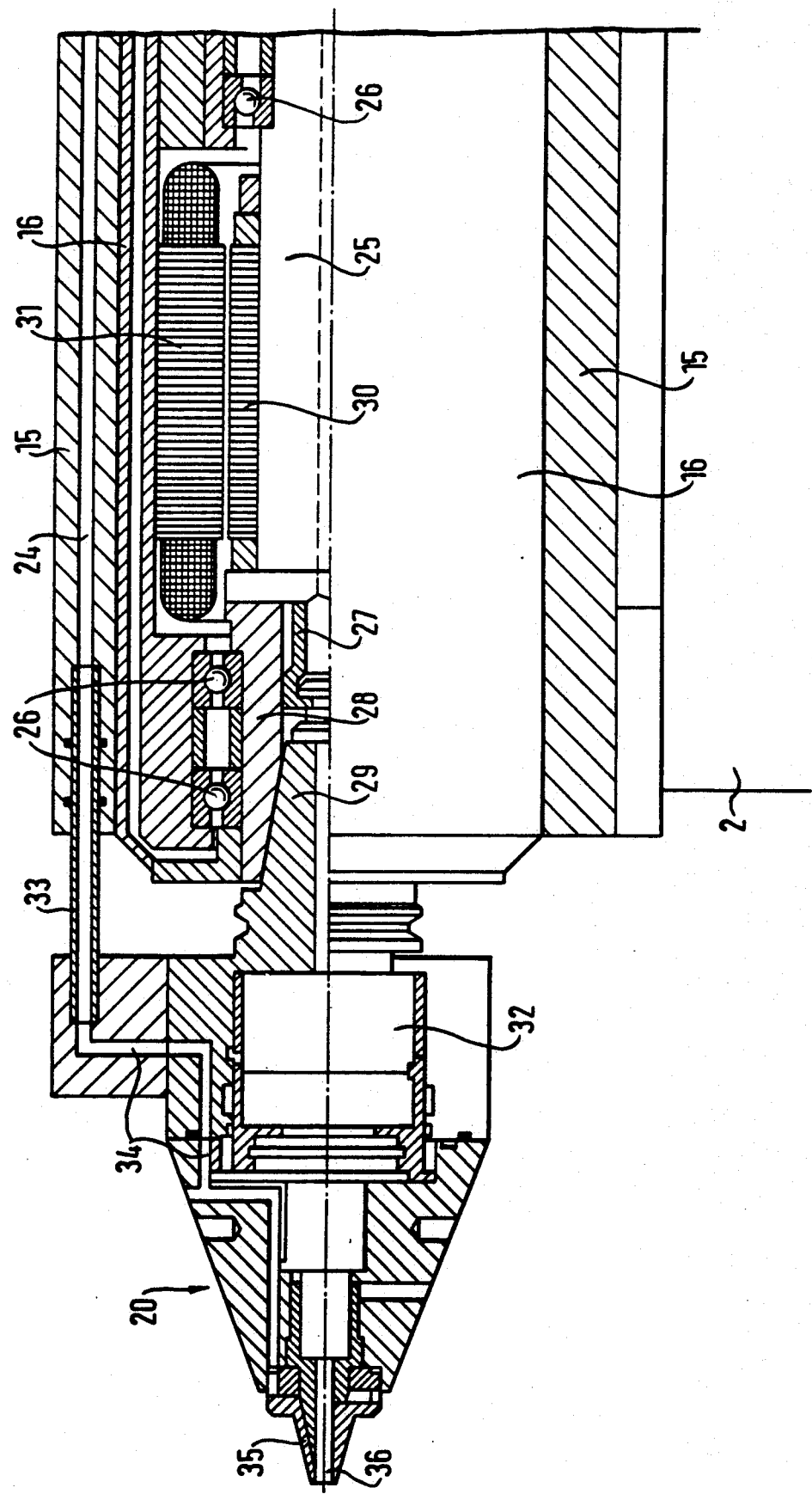
FIG. 2 is a partial sectional side view of the housing for accommodating, among other things, the main spindle, a laser head being mounted therein.

As will be apparent from FIGS. 2 and 3, the interior of guide tube 16 has main spindle 25 journaled for rotation in antifriction bearings 26, locking elements in the form of collet chuck 27 being disposed in the interior of the spindle. Forward end part 28 of the main spindle has a taper hole for fixedly accommodating tool holder 29 (ISO taper), the free end of which is engaged by collet chuck 27. Main spindle 25 has rotor 30 of a high speed motor mounted thereon, hollow cylindrical stator 31 of the motor being mounted in the guide tube.

In the embodiment illustrated in FIG. 2, nozzle head is attached to tool holder 29 and additionally has focussing optical system 32, not illustrated in detail, for the laser beam integrated thereon. A fluid coupling designed as sliding sleeve 33 establishes fluid communication between fluid passageway 24 formed within housing 15 and duct system 34 formed within the nozzle head. The front end of nozzle head 20 carries nozzle 35 which has central outlet orifice 36. A particularly suitable nozzle design is described in the German Utility Model application G 8911733.6.

As will be apparent from FIG. 3, milling tool 40 is fixed by means of conventional tool holder 41 in main spindle 28 instead of nozzle/laser head 20 illustrated in FIG. 2, wherein the changing operations are performed by a tool changer, not illustrated, the gripping members of which engage the collars of the tool holders 29 and 41, respectively.

The mode of operation of the machine tool according to the invention will be readily apparent from the drawing. For laser machining of workpiece 12, knee table 4 is moved upwardly in the direction of the arrow Y until the machining site on the workpiece lies in axis 19 of the laser beam. At the same time guide tube 16 is advanced until nozzle head 20 is immediately in front of the work surface to be machined. Laser unit 18 is energized to perform removal of material in layers, while the work table performs combined horizontal motions in the direction of the X-axis as well as swivel motions about vertical axis 8 in the direction of double arrow To perform metal cutting operations on workpiece 12, nozzle/laser head 20 shown in FIG. 2 is replaced, with the aid of a non-illustrated tool changer, by cutting tool 40. The changing operations may be automated by means of a program control system. Instead of the milling tool shown in FIG. 3, it is, of course, possible to mount other tools especially for equalizing and superfinishing the work surfaces previously obtained by laser beam. To this end it would be suitable to allocate to the machine tool of FIG. 1 a tool magazine loaded with a multiplicity of tools, wherein the magazine could also comprise nozzle/laser heads of different design.

The invention is not limited to the illustrated embodiment. Differently configured milling and drilling machines and optionally lathes may also be equipped with a laser unit positioned in the axis of the main spindle, in which case the main spindle would be provided with a central through hole for the laser beam. The invention is limited only by the spirit and scope of the accompanying claims.

What is claimed is:

1. A machine tool for laser beam machining of workpieces, the machine tool having a column extending from a base, the machine tool comprising:
   a housing mounted on said column, said housing having a longitudinal axis;
   a motor-driven hollow main spindle journaled within said housing;
   a laser unit mounted on said column at one end of said housing;
   locking elements adapted for fixing a tool holder within said main spindle;
   a nozzle head secured at the end of said main spindle opposite to said laser unit, said nozzle head having means for supplying at least one fluid to the central exit opening of the laser beam; and
   a focusing optical system in said nozzle head for focussing the laser beam.

2. machine tool recited in claim 1, and further comprising:
   a tool holder secured within said main spindle by means of said locking elements;
   said nozzle head and said focussing optical system being mounted to said tool holder;
   said main spindle and said locking elements are shaped and configured to further receive and retain a conventional tool holder for metal cutting tools.

3. The machine tool recited in claim 1 or claim 2, and further comprising a high-speed motor disposed within said housing in coaxial relationship with said longitudinal axis, the motor having a rotor coupled to said main spindle.

4. The machine tool recited in claim 1 or claim 2, wherein:
   said housing has fluid passageways therein;
   said nozzle head has a duct system therein, said machine tool further comprising:
   fluid couplings for supplying fluid from said passageways to said duct system.

5. The machine tool recited in claim 3, wherein: said housing has fluid passageways therein;
   said nozzle head has a duct system therein, said machine tool further comprising:
   fluid couplings for supplying fluid from said passageways to said duct system.

6. The machine tool recited in claim 1 or claim 2, and further comprising a motor driven longitudinally movable guide tube, said main spindle being mounted within said guide tube.

7. The machine tool recited in claim 3, and further comprising a motor driven longitudinally movable guide tube, said main spindle and said motor being mounted within said guide tube.

8. The machine tool recited in claim 4, and further comprising a motor driven longitudinally movable guide tube, said main spindle being mounted within said guide tube.

9. The machine tool recited in claim 5, and further comprising a motor driven longitudinally movable guide tube, said main spindle and said motor being mounted within said guide tube.

* * * * *